United States Patent
Nakamura et al.

(10) Patent No.: US 6,563,607 B1
(45) Date of Patent: *May 13, 2003

(54) IMAGE COMMUNICATION APPARATUS

(75) Inventors: Naomi Nakamura, Kawaguchi (JP); Toru Maeda, Mitaka (JP); Hitoshi Saito, Yokohama (JP); Masanori Momose, Tokyo (JP); Toru Fujino, Urawa (JP); Shinichiro Kohri, Kawasaki (JP); Makoto Kobayashi, Kawasaki (JP); Kazuhiro Sugawara, Tokyo (JP); Satoshi Imai, Koganei (JP); Yasushi Morimoto, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/778,102

(22) Filed: Jan. 2, 1997

(30) Foreign Application Priority Data

Jan. 8, 1996 (JP) .............................................. 8-016968
Feb. 5, 1996 (JP) .............................................. 8-040305

(51) Int. Cl.$^7$ ................................................ H04N 1/00
(52) U.S. Cl. ...................................... 358/450; 358/449
(58) Field of Search .......................... 358/468, 448–453, 358/498

(56) References Cited

U.S. PATENT DOCUMENTS

| | | | | |
|---|---|---|---|---|
| 3,701,972 A | * | 10/1972 | Berkeley et al. ......... | 340/172.5 |
| 4,357,680 A | * | 11/1982 | Greek, Jr. et al. ........ | 364/900 |
| 4,630,198 A | * | 12/1986 | I-Yuan ....................... | 364/200 |
| 5,075,783 A | * | 12/1991 | Yoshida et al. ........... | 358/439 |
| 5,191,429 A | * | 3/1993 | Rourke ...................... | 358/296 |
| 5,357,348 A | * | 10/1994 | Moro ......................... | 358/450 |
| 5,568,280 A | * | 10/1996 | Wells et al. ............... | 358/468 |
| 6,130,965 A | * | 10/2000 | Kobayashi et al. ....... | 382/284 |

* cited by examiner

Primary Examiner—Thomas D. Lee
Assistant Examiner—Stephen Brinich
(74) Attorney, Agent, or Firm—Fitzpatrick, Cella, Harper & Scinto

(57) ABSTRACT

In case of reading an original of plural pages and collectively transmitting the successive short length pages as one page, the number of transmitted pages recorded on a transmission record list becomes different from the number of read pages, so that it is difficult for a user to judge, from such list, whether all the pages have been transmitted. In case the number of actually transmitted pages is different from the number of read or received pages stored in the second RAM, the user can select in advance, by a key depression on a keyboard, whether to record both the number of actually transmitted pages and the number of read or received pages stored in the second RAM or to record either one of the numbers, as the number of pages to be recorded on the transmission result list. In case of storing image data of plural pages of original read by a contact sensor in an image memory and collectively transmitting the image data of successive plural pages, stored in the image memory, as one page, judging from the recordable number of lines at the receiving side, a CPU causes a display unit to display both the number of actually transmitted page number and the number of read page included in the transmitted pages.

26 Claims, 6 Drawing Sheets

FIG. 5A
READ IMAGE
PAGE i
PAGE i+1
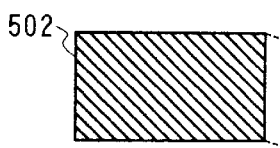
PAGE i+2
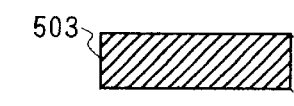
PAGE i+3
FIG. 5B
IMAGE STORED FOR TRANSMISSION
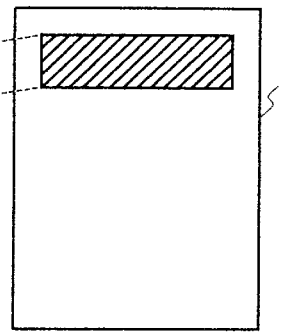
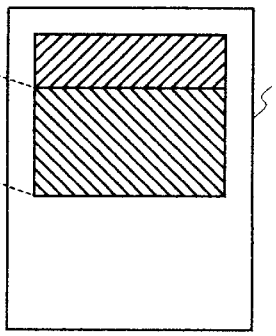
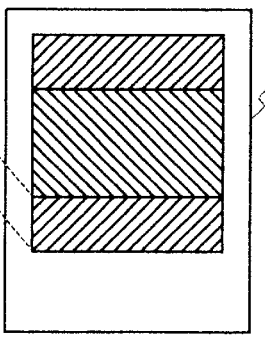
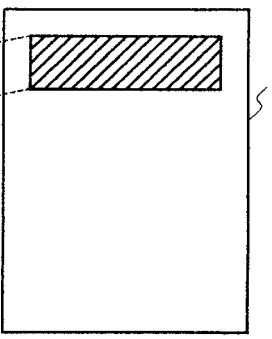
FIG. 5C
INDICATION ON LCD
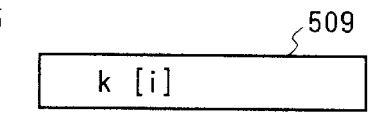
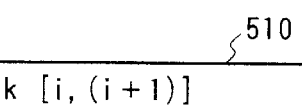
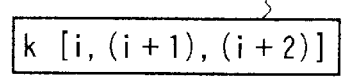
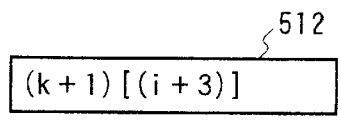

IMAGE COMMUNICATION APPARATUS

BACKGROUND OF THE INVENTION

1. Field of the Invention

The present invention relates to an image communication apparatus.

2. Related Background Art

As an example of an image communication apparatus, a facsimile apparatus is contemplated. A conventional facsimile apparatus generally employs a rolled sheet as a recording sheet, and recording or transmission is executed for each page, regardless of the length in a sub-scanning direction (sub-scanning length) of an image of a read original.

However, cut sheets of a fixed size are increasingly used in recent years, and, in case of recording or transmission of an original of a short sub-scanning length, an image is formed only on an upper area of a recording sheet, thereby resulting in wasted consumption of the recording sheets.

For this reason, as disclosed in the U.S. patent application Ser. No. 08/691,680 filed on Aug. 2, 1996, such a method is proposed that when image data read by image reading means and stored in a memory is to be transmitted, if short length originals are in succession and the sum of sub-scanning length of successive pages does not exceed a predetermined sheet size, the successive plural pages are transmitted as one page of image.

This method allows to save the consumption of the recording sheets in a receiving side by transmitting the successive short length originals as one page.

In such conventional technology, however, regarding a transmission result report indicating a transmission start time, a transmission period, the number of transmitted pages and the result of transmission, for each transmission, or regarding a communication management list indicating the status of communication for each communication (these reports being hereinafter collectively called as a communication result record list) is the number of actually transmitted pages. Therefore, in case of reading plural sheets of originals and collectively transmitting successive short length originals as one page, the number of transmitted pages appearing on the transmission result record list is different from the number of read originals, so that a user cannot judge, from the list, whether all the pages have been transmitted.

Also, in a facsimile apparatus having so-called relay function for accumulating received image data in a memory, and recording the accumulated image data or transmitting the accumulated image data to plural facsimile apparatus designated by a terminal of a calling station, if received originals to be relayed are successive short length originals and are collectively transmitted as one page, the transmission result record list shows the number of relay-transmitted originals and the number of received original for relay being different from each other, thus puzzling the user.

Also, as disclosed in the Japanese Patent Application No. 7-248307 filed on Oct. 3, 1995, a facsimile apparatus is porposed which stores image data of originals of plural pages read by image reader means and the number of lines of each page in a memory, takes as a threshold value the number of recordable lines at a receiving side obtained in view of the sub-scanning length of a recording sheet at a receiving side, and collectively transmits the image data of successive plural pages stored in the memory as one page if the sum of the recordable line numbers of the image data of the successive plural pages does not exceed the above-mentioned threshold value.

Also, in the conventional facsimile apparatus, only the number of pages actually transmitted is displayed.

However, in the above-explained conventional apparatus, in case the image data of successive plural pages stored in the memory is collectively transmitted as one page after checking the number of the recordable lines at the receiving side, the conventional display merely indicating the number of the transmitted pages does not allow the user to judge which pages read at the sending side are contained in said one page as received.

SUMMARY OF THE INVENTION

An object of the present invention is to improve the image communication apparatus.

Another object of the present invention is to provide a facsimile apparatus which allows the user to easily and securely judge from the transmission result record list whether all the pages have been transmitted, and in which, in case the received originals designated for relay transmission are successive short length originals and are collectively transmitted as one page, the number of received originals for relay transmission and the number of relay-transmitted originals do not mutually differ on the transmission result record list.

Still another object of the present invention is to provide a facsimile apparatus which allows the user, in case the image data of successive plural pages stored in the memory is collectively transmitted as one page after checking the number of the recordable lines at the receiving side, to securely judge which pages read at the sending side are contained in the one page as received.

BRIEF DESCRIPTION OF THE DRAWINGS

FIGS. 5A, 5B and 5C are views showing the image data during the accumulating operation and corresponding indications on a display unit, in a facsimile apparatus according to the third embodiment of the present invention.

DETAILED DESCRIPTION OF THE PREFERRED EMBODIMENTS

In the following preferred embodiments of the present invention will be described with reference to the attached drawings, taking facsimile apparatus as an example of the image communication apparatus.

First Embodiment

Figure 1:
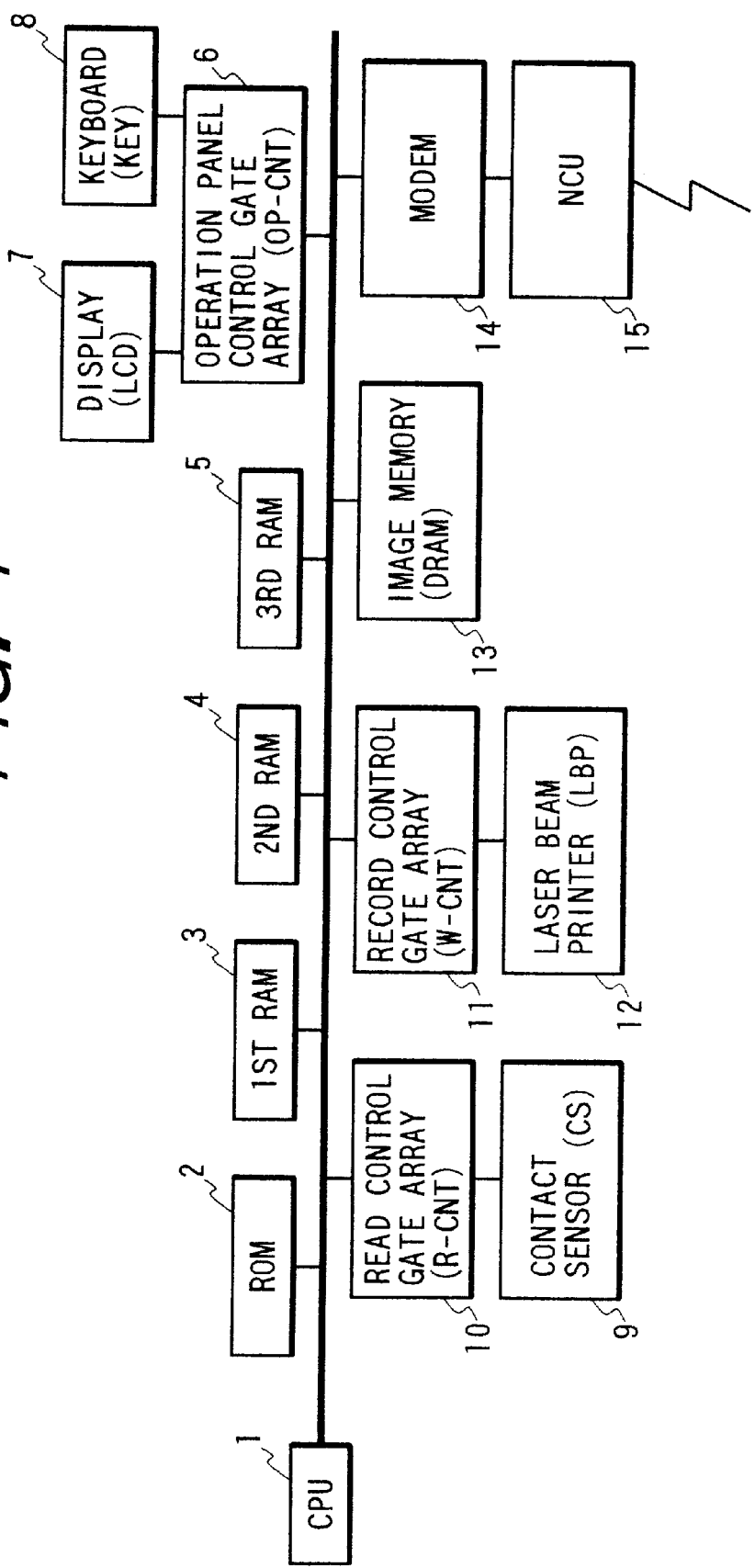
FIG. 1 is a block diagram showing the configuration of a facsimile apparatus according to the first embodiment of the present invention.
Figure 2:
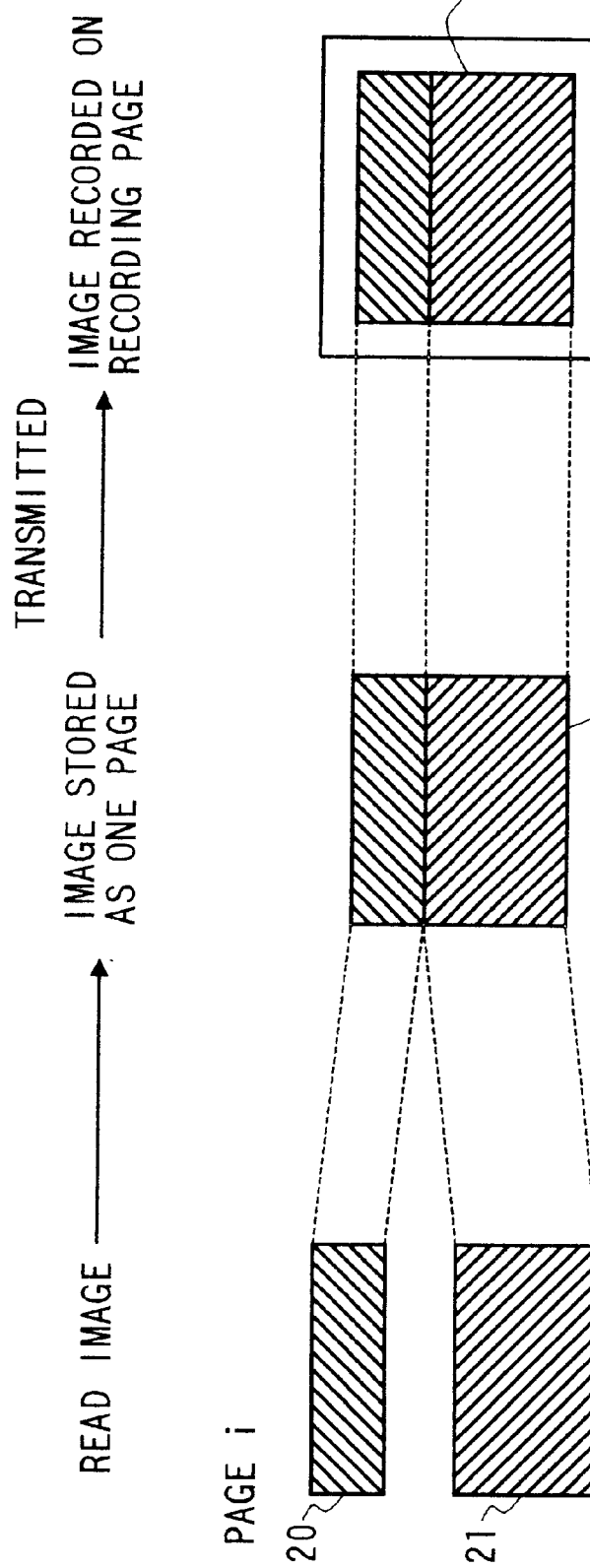
FIGS. 2A, 2B and 2C are views showing a flow of image data at the process execution in the above-mentioned facsimile apparatus.

The first embodiment of the present invention will be explained with reference to FIGS. 1 to 3. FIG. 1 is a block diagram showing the configuration of a facsimile apparatus according to the first embodiment of the present invention, wherein a CPU (central processing unit) 1 controls the entire apparatus according to a program stored in a ROM (read-only memory) 2. If necessary, a first RAM (random access memory) 3 is used as a work area.

An original is read by a contact sensor (CS) 9 constituting reading means, and the obtained signal is compression-encoded through a reading control gate array (R-CNT) 10, and stored in an image memory (DRAM) 13. At the same time, the management information such as "reception number", "destination information", "number of pages", "stored image memory block information", "resolution", "image size" and "number of lines for each page" are stored in a second RAM 4. When the recording is requested by the CPU 1, the image information stored in the image memory 13 and the management information stored in the second RAM 4 are expansion (or decompression)-decoded by a recording control gate array (W-CNT) 11 and are recorded on a recording sheet by a laser beam printer (LBP) 12.

In in case of a transmission request from the CPU 1, the image information stored in the image memory 13 is compression-encoded by the CPU 1 according to a mode of a partner apparatus, then PM-AM modulated by a modulator-demodulator (MODEM) 14 and outputted to a communication line through a network control unit (NCU) 15.

Image data received through the above-mentioned communication line are supplied through the network control unit 15 to the modem 14, then demodulated therein and expansion-decoded by the CPU 1, and stored in the image memory 13 while the management information is stored in the second RAM 4.

A user can enter various instructions, settings and input of information by depressing keys on a keyboard 8 constituting information input means, and the contents of such instructions, settings and input information are stored in a third RAM 5, and displayed on a display unit (LCD) 7 for confirmation. In this operation, the CPU 1 detects key input data from the keyboard 8 through an operation panel control gate array (OP-CNT) 6 and causes the display unit 7 to display necessary data. Also, during the transmission the CPU 1 causes the display unit 7 to display the page number currently under transmission and the read page number contained in the page.

FIGS. 2A to 2C show a flow of the image data in the facsimile apparatus of the above-explained configuration. These drawings show a state in which, within the read originals, an i-th page 20 and an (i+1)th page 21 are stored in a united state, wherein i indicates a count of a page counter at the image reading. FIG. 2A indicates a read image, FIG. 2B indicates an accumulated image, stored in the image memory 13, and FIG. 2C indicates a received image, recorded on the recording sheet at the receiving side.

At first, plural pages of the originals are read by the contact sensor 9, and, if the i-th page 20 and the (i+1)th page 21 are to be transmitted as a united page (or one page), the image data of the i-th page 20 is stored in the image memory 13 and then the image data of the (i+1)th page 21 is stored as data of the same page in the image memory 13. Consequently the i-th page 20 and the (i+1)th page 21 are stored as image data 22 of one page in the image memory 13. As a result, there is obtained, on a recording sheet 23 at the receiving side, an image 24 consisting of the i-th page 20 and the (i+1)th page 21.

In the following there will be explained a process operation of the facsimile apparatus of the present embodiment with reference to FIG. 3. This drawing illustrates a flow chart showing a control sequence in the operation of the facsimile apparatus of the present embodiment, in case of selectively setting the number of transmitted pages to be written on the transmission result record list according to the setting registered in advance by the registration means (keyboard). This flow chart is executed when the transmission result record list is outputted.

Figure 3:
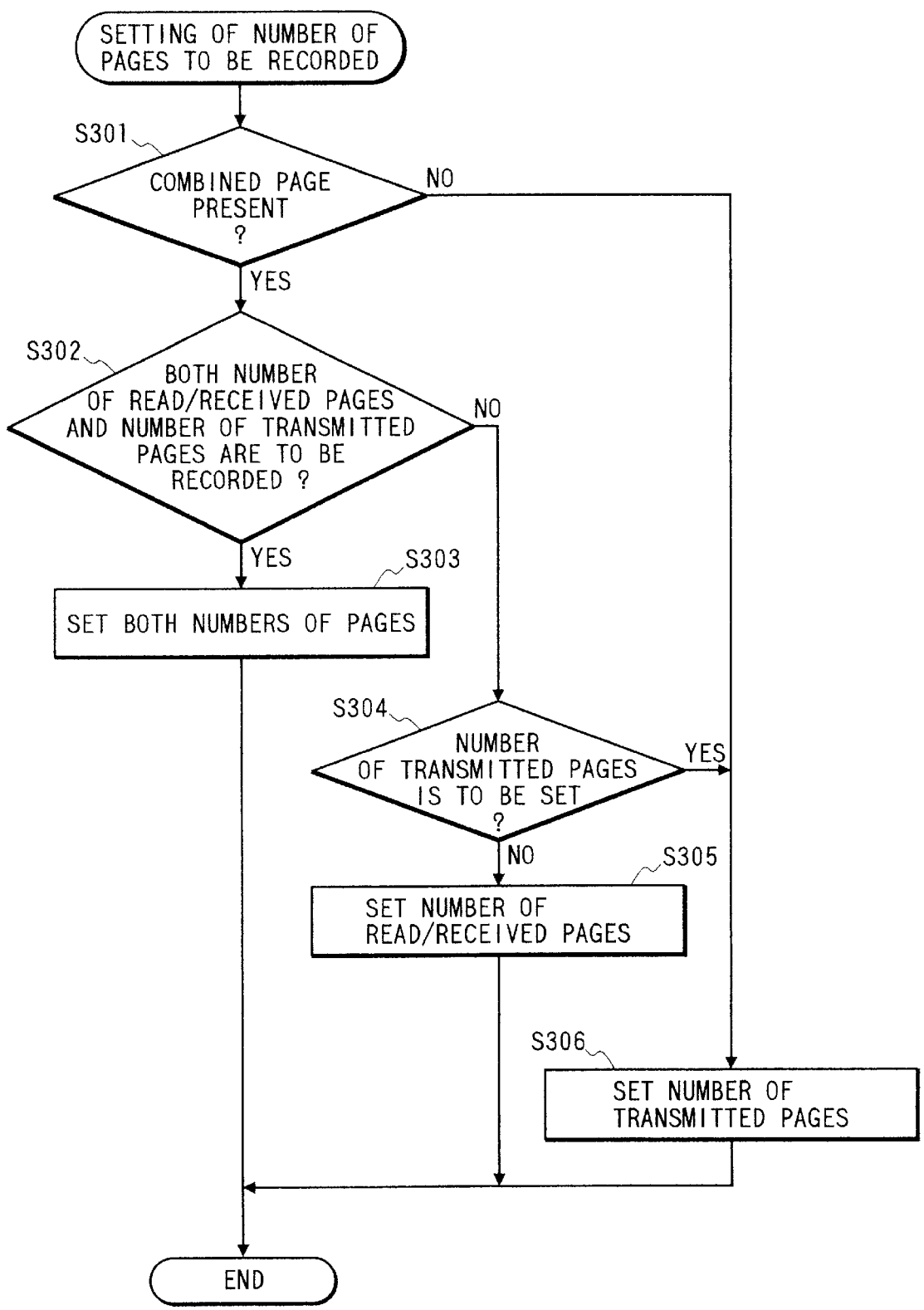
FIG. 3 is a flow chart showing a control sequence of the process execution in the above-mentioned facsimile apparatus.

Referring to FIG. 3, at first a step S301 discriminates, based on the management information stored in the second RAM 4, whether a united page, formed from successive plural pages, is present, and, if absent, a step S306 writes the number of transmitted pages and the present sequence is terminated. If such united page is present, a step S302 discriminates whether both the number of transmitted pages and the number of read or received pages are to be written, and, if both page numbers are to be written, a step S303 sets the number of read or received pages and the number of transmitted pages, and the present sequence is terminated.

If either the number of transmitted pages or, number of the read or received pages is to be written, a step S304 discriminates whether the number of transmitted pages or the number of read or received pages is to be written, and, in case writing the number of transmitted pages, the aforementioned step S306 sets the number of transmitted pages, and the present sequence is terminated. If the step S304 identifies that the number of transmitted pages is not to be written, a step S305 writes the number of read or received pages and the present sequence is terminated.

In the facsimile apparatus of the present embodiment, as explained in the foregoing, the user can arbitrarily select, by registration in advance by the registration means, whether to write, as the page number written on the transmission result record list, both the transmitted page number and the read or received page number stored in the memory, or either only of these page numbers.

Second Embodiment

In the following, there will be explained the second embodiment of the present invention, with reference to FIG. 4. As a basic configuration of the facsimile apparatus of the second embodiment is same as that of the first embodiment shown in FIG. 1, it may be explained with reference to FIG. 1.

Figure 4:
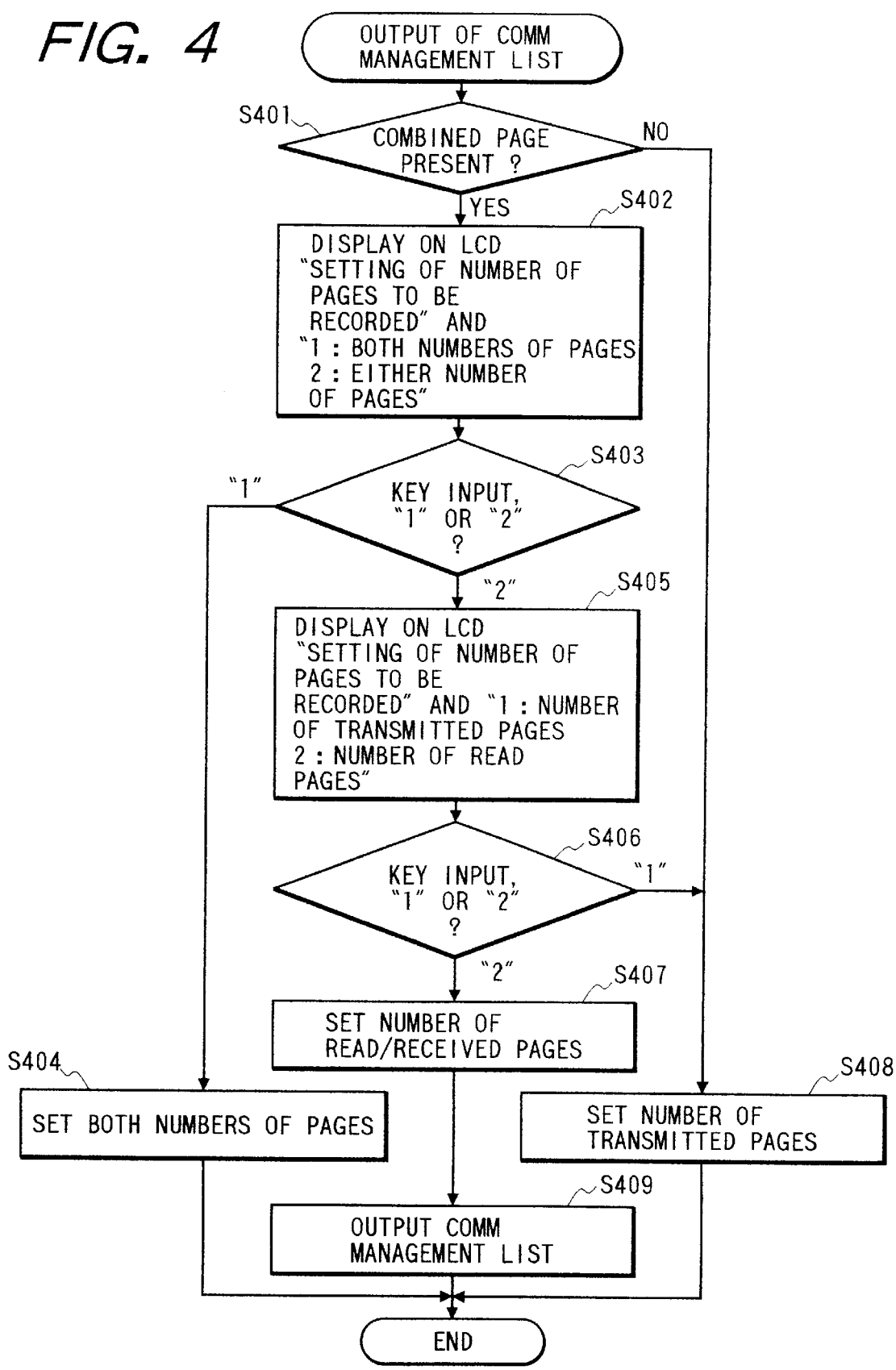
FIG. 4 is a flow chart showing a control sequence of the process execution in a facsimile apparatus according to the second embodiment of the present invention.

FIG. 4 is a flow chart showing a control sequence in the facsimile apparatus of the second embodiment, for, in outputting the communication management list as the transmission result record list, select the number of pages to be written on the list by a key actuation by means of a user. This process is executed when the communication management list is outputted by the key actuation by means of the user.

Referring to FIG. 4, at first a step S401 discriminates, based on the management information stored in the second RAM 4, whether a united page, formed from successive plural pages, is present, and, if absent, a step S408 sets the number of transmitted pages for recording on the communication management list, and a step S409 outputs the communication management list. If the step S401 identifies such united page is present, a step S402 displays messages "setting of number of pages to be recorded" and "1: both numbers of pages 2: either number of pages" on the display unit 7, for prompting the user to select recording of both the number of transmitted pages and the number of read or received pages or recording of one of these numbers, and a step S403 discriminates whether "1" or "2" has been entered by the key.

If "1" is entered by the key, a step S404 sets both the number of transmitted pages and the number of read or received pages as the number of pages to be recorded, and the aforementioned step S410 outputs the communication management list. If "2" is entered by the key, a step S405 displays messages "setting of number of pages to be recorded" and "1: number of transmitted pages, 2: number of read pages" on the display unit 7, for prompting the user to select recording of the number of transmitted pages or the number of read or received pages, and a step S406 discriminates whether "1" or "2" has been entered by the key.

If "1" is entered by the key, the aforementioned step S408 sets the number of transmitted pages as the number of pages to be recorded, and the aforementioned step S409 outputs the communication management list. If "2" is entered by the key, a step S407 sets the number of read or received pages as the number of page to be recorded, and the aforementioned step S409 outputs the communication management list.

In the facsimile apparatus of the present embodiment, as explained in the foregoing, the user can previously select by the key operation whether to record both the number of actually transmitted pages and the number of read or received pages or to record the number of read or received pages stored in the memory on the communication management report when these two numbers are different from each other at the output of the communication management list.

In the foregoing facsimile apparatus, if the number of transmitted pages and the number of read or received pages are mutually different, the user arbitrarily select whether to record both numbers or to record either number on the transmission result record list, so that the user can obtain more options.

Also the user can easily and securely recognize whether the transmission has been properly completed, since user's desired data can be recorded on the transmission result record list.

Third Embodiment

As the configuration of the facsimile apparatus of the third embodiment of the present embodiment is same as that shown in FIG. 1, it may be explained with reference to the drawing.

FIGS. 5A to 5C are views showing the accumulating operation for the image data and the corresponding display states on the display unit 7 in the facsimile apparatus. These figures show a state where an i-th page 501, an (i+1)th page 502 and an (i+2)th page 503 at the image reading can be united as a k-th page at the transmission, but an (i+3)th page 504 cannot be united, wherein i indicates a count of a page counter at the image reading while k indicates a count of a page counter at the transmission. FIG. 5A indicates a read image, FIG. 5B indicates an image in a transmission buffer and FIG. 5C indicates contents on the display unit 7. In the drawings, the accumulating process proceeds from top to bottom. The transmission buffer is formed by the first RAM.

After plural pages are read and stored in the image memory 13, the image data of the i-th page 501 at the image reading is stored in the transmission buffer and a message k[i] 509, indicating that the i-th page is included in the k-th page at the transmission, is displayed on the display unit 7. Then the image data of the (i+1)th page 502 is stored as the data of the same page in the transmission buffer, and a message k[i, (i+1)] 510, indicating that the i-th and (i+1th pages at the image reading are included in the k-th page at the transmission, is displayed on the display unit 7. Also the image data of the (i+2)th page 503 at the image reading is stored as the data of the same page in the transmission buffer, and a message k[i, (i+1), (i+2)] 511, indicating that the i-th, (i+1)th and (i+2)th pages at the image reading are included in the k-th page at the transmission, is displayed on the display unit 7.

Thus, the i-th page 501, (i+1)th 502 and (i+2)th page 503 at the image reading are stored in succession as the image data of a single page in the transmission buffer (see numerals 505–507 in FIG. 5B), with successive displays of the storage states on the display unit 7 (see numerals 509–511 in FIG. 5C), and are united as the k-th page at the transmission. The (i+3)th page 504 at the image reading, which cannot be united, is stored in a (k+1)th page 508 and a message (k+1)[(i+3)] 512, indicating such state, is displayed on the display unit 7.

In the following, an operation of the facsimile apparatus of the present embodiment will be explained with reference to FIG. 6, based on the image data accumulating operation and the display operation of the display unit 7 as shown in FIGS. 5A to 5C. In the present embodiment, it is assumed that the i-th page 501, (i+1)th page 502, (i+2)th page 503 and (i+3)th page 504 are same in the reading width and in the reading resolution.

In the following description, i indicates a count of the page counter at the image reading; j indicates a count at the image reading starting from the i-th page 501; k indicates a count of the page counter at the transmission; $x_i$ indicates the number of lines of the image data of the i-th page at the image reading, stored in the transmission buffer at the transmission; and $x_{i+j}$ indicates the number of lines of the image data of the (i+j)th page at the image reading. Also, y indicates a threshold value for judging whether the image data of successive plural pages are to be united into a page, and it is determined according the information, such as the width of a recording sheet transmitted from a transmitting partner apparatus in the communication protocol and the size of a cut sheet allowable at the receiving side. For example, if the width of the recording sheet is of A4 size and the reading resolution is a standard, the number of lines recordable on the A4 recording sheet with the standard resolution is set as the threshold value y.

Figure 6:
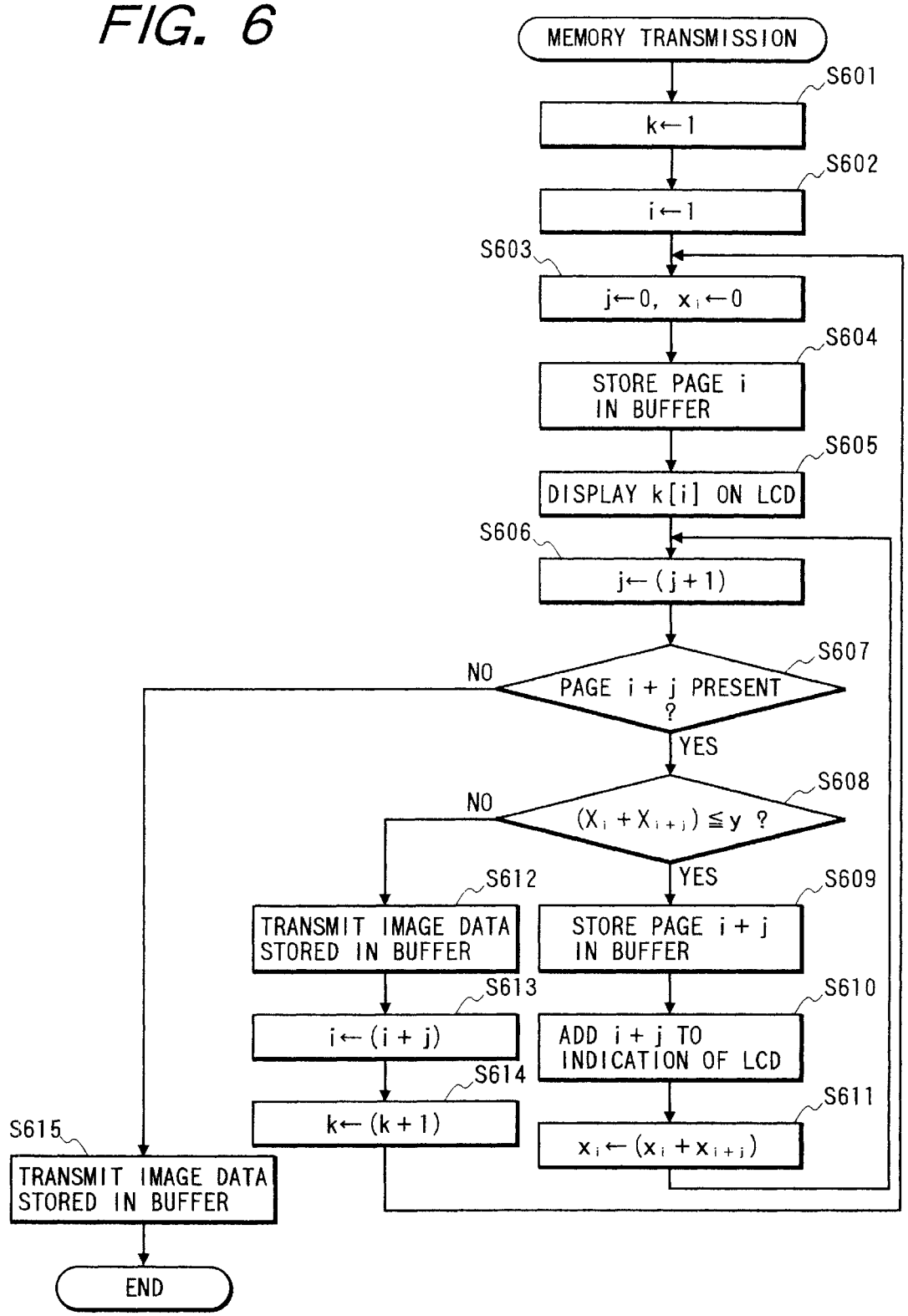
FIG. 6 is a flow chart showing a control sequence of the process execution in the above-mentioned facsimile apparatus.

FIG. 6 is a flow chart indicating a control sequence of a memory transmission operation of the facsimile apparatus of the present embodiment. At the transmission, at first, steps S601 and S602 set "1" in the transmission page counter k and the reading page counter i, and a step S603 sets "0" in the page counter j and the stored line number $x_i$ of the transmission buffer. Then a step S604 stores the image data of the i-th page 501, stored in the image memory 13, in the transmission buffer, and sets the number of read lines of the i-th page 501 as the stored line number $x_i$ of the transmission buffer. Then a step S605 causes the display unit 7 to display a message (509 in FIG. 5C) indicating that the i-th page at the image reading is included in the k-th page at the transmission.

Then a step S606 adds 1 to the page counter j, and a step S607 discriminates whether the (i+j)th page is stored in the image memory 13. If not, a step S615 executes transmission of the image data stored in the transmission buffer, and the present sequence is terminated. On the other hand, if the (i+j)th page is stored in the step S607, a step S608 compares the sum $(x_i+x_{i+j})$ of the stored line number $x_i$ of the transmission buffer and the stored line number $x_{i+j}$ of the (i+j)th page with the threshold value y corresponding to the number of lines occurable on the recording sheet at the receiving side, and, if the above-mentioned sum is smaller than the threshold value y, a step S609 unites the image data of the (i+j)th page with the image data of the preceding page in the transmission buffer, thereby obtaining the stored image 506 in the transmission buffer as shown in FIG. 5B.

Then, a step S610 causes the display unit 7 to display a message (510 and 511 in FIG. 5C), indicating the (i+j)th page, in addition to the i-th to (i+j−1)th pages at the image reading, is included in the k-th page at the transmission. Then, a step S611 adds the stored line number $x_{i+j}$ of the (i+j)th page to the stored line number $x_i$ of the transmission buffer, and the sequence returns to the step S606.

On the other hand, if the aforementioned step S608 identifies that the sum $(x_i+x_{i+j})$ of the stored line numbers is larger than the threshold value y, a step S612 transmit the image data of the transmission buffer to the partner station, and a step S613 renews the value i of the reading page counter i to a sum of the value i and the value j counted from the j-th page at the image reading. Then a step S614 adds 1 to the page k at the transmission and the sequence returns to the step S603.

The above-explained sequence is repeated until the memory transmission of one communication is completed.

As detailed in the foregoing, in the facsimile apparatus of the present invention, if the sum of the sub-scanning length of the successive plural pages is less than the length of the recording sheet at the receiving side when the image data of the originals of plural pages read by the image reading means is to be transmitted, such successive pages are united and transmitted as an image of one page, and both pages at the transmission and pages at the image reading, included in said transmitted pages are displayed, so that the user can securely recognize thus united pages and the corresponding page in the transmission.

What is claimed is:

1. An output apparatus to which is inputted data of a plurality of pages that includes at least two pages of respectively different sizes, said output apparatus including functions of determining a number of pages to be combined in accordance with page sizes of the inputted data, combining the determined number of pages as one page, and outputting the thus combined data, said output apparatus comprising:
    a memory for storing a number of pages of inputted data before combination and a number of pages after combination, the pages of inputted data before combination being of at least two different sizes;
    a discrimination unit for discriminating whether or not combination of pages of inputted data as one page is to be carried out; and
    a recording unit for recording the number of pages of inputted data before combination, when data combined as one page is absent, without recording the number of pages after combination, and recording on an output result report both the number of pages of inputted data before combination and the number of pages after combination, when data combined as one page is present.

2. An output apparatus according to claim 1, further comprising a selector for selecting whether said recording unit records on the output result report both the number of pages after combination and the number of pages of inputted data before combination or only the number of pages of inputted data before combination.

3. An output apparatus according to claim 1, further comprising a selector for selecting whether said recording unit records on the output result report both the number of pages of inputted data before combination and the number of pages after combination or only the number of pages after combination.

4. An output apparatus according to claim 1, further comprising a selector for selecting whether said recording unit records on the output result report both the number of pages of inputted data before combination and the number of pages after combination, only the number of pages of inputted data before combination, or only the number of pages after combination.

5. An output apparatus to which is inputted data of a plurality of pages that includes at least two pages of respectively different sizes, said output apparatus including functions of determining a number of pages to be combined in accordance with page sizes of the inputted data, combining the determined number of pages as one page, and outputting the thus combined data, said output apparatus comprising:
    a memory for storing a number of pages of inputted data before combination and a number after combination, the pages of inputted data before combination being of at least two different sizes;
    a display unit for simultaneously displaying the number of pages of inputted data before combination and the number of pages after combination, as stored in said memory, while a page of data is outputted; and
    a display control unit for controlling said display unit to update the number of pages before combination without updating the number of pages after combination, while plural pages of the inputted data combined as one page are outputted.

6. An output apparatus according to any one of claims 1 and 5, wherein the data is image data.

7. An output apparatus according to any one of claims 1 and 5, wherein said output apparatus is a transmitting apparatus.

8. An output apparatus according to any one of claims 1 and 5, wherein said output apparatus is a facsimile apparatus.

9. An output apparatus according to any one of claims 1 and 5, further comprising an input unit for inputting data.

10. An output apparatus according to claim 9, wherein said input unit is a reading unit for reading an original document.

11. An output apparatus according to claim 9, wherein said input unit is a receiver.

12. An output method for an output apparatus to which is inputted data of a plurality of pages that includes at least two pages of respectively different sizes, said method including functions of determining a number of pages to be combined in accordance with page sizes of the inputted data, combining the determined number of pages as one page, and outputting the thus combined data, said method comprising the steps of:
    storing a number of pages of inputted data before combination and a number of pages after combination, the pages of inputted data before combination being of at least two different sizes;
    discriminating whether or not combination of pages of inputted data as one page is to be carried out; and
    recording the number of pages of inputted data before combination, when data combined as one page is absent, without recording the number of pages after combination, and recording on an output result report both the number of pages of inputted data before combination and the number of pages after combination, when data combined as one page is present.

13. An output method according to claim 12, further comprising the step of selecting whether said recording step records on the output result report both the number of pages after combination and the number of pages of inputted data before combination or only the number of pages of inputted data before combination.

14. An output method according to claim 12, further comprising the step of selecting whether said recording step records on the output result report both the number of pages of inputted data before combination and the number of pages after combination or only the number of pages after combination.

15. An output method according to claim 12, further comprising the step of selecting whether said recording step records on the output result report both the number of pages of inputted data before combination and the number of pages after combination, only the number of pages of inputted data before combination, or only the number of pages after combination.

16. An output method of an output apparatus to which is inputted data of a plurality of pages that includes at least two pages of respectively different sizes, said method including functions of determining a number of pages to be combined in accordance with page sizes of the inputted data, combining the determined number of pages as one page, and outputting the thus combined data, said method comprising the steps of:

storing in a memory a number of pages of inputted data before combination and a number of pages after combination, the pages of inputted data before combination being of at least two different sizes;

simultaneously displaying on a display unit the number of pages of inputted data before combination and the number of pages after combination, as stored in the memory, while a page of data is outputted; and controlling the display unit to update the number of pages before combination without updating the number of pages after combination, while plural pages of the inputted data combined as one page are outputted.

17. An output method according to any one of claims 12 and 16, wherein the data is image data.

18. An output method according to any one of claims 12 and 16, wherein said output method is for use by a transmitting apparatus.

19. An output method according to any one of claims 12 and 16, wherein said output method is for use by a facsimile apparatus.

20. An output method according to any one of claims 12 and 16, further comprising the step of inputting data.

21. An output method according to claim 20, wherein said inputting step is a reading step for reading an original document.

22. An output method according to claim 20, wherein said inputting step is a receiving step.

23. An output apparatus to which is inputted data of a plurality of pages, said output apparatus including functions for determining a number of pages to be combined in accordance with page sizes of the inputted data, combining the determined number of pages as one page, and outputting the thus combined data, said output apparatus comprising:

a memory for storing a number of pages of inputted data before combination and a number of pages after combination;

a discrimination unit for discriminating whether or not combination of pages of inputted data as one page is to be carried out;

an input unit for enabling a user to input a selection to record one of the number of pages of inputted data before combination, the number of pages after combination, and both the number of pages of inputted data before combination and the number of pages after combination; and a recording unit for recording one of the number of pages of inputted data before combination, the number of pages after combination, and both the number of pages of inputted data before combination and the number of pages after combination, in accordance with the selection inputted by the user using said input unit.

24. An output method of an output apparatus to which is inputted data of a plurality of pages, the output apparatus including functions for determining a number of pages to be combined in accordance with page sizes of the inputted data, combining the determined number of pages as one page, and outputting the thus combined data, said method comprising the steps of:

storing a number of pages of inputted data before combination and a number of pages after combination;

discriminating whether or not combination of pages of inputted data as one page is to be carried out;

inputting, by a user, a selection to record one of the number of pages of inputted data before combination, the number of pages after combination, and both the number of pages of inputted data before combination and the number of pages after combination; and recording one of the number of pages of inputted data before combination, the number of pages after combination, and both the number of pages of inputted data before combination and the number of pages after combination, in accordance with the selection inputted by the user in said inputting step.

25. An output apparatus to which is inputted data of a plurality of pages, said output apparatus including functions for determining a number of pages to be combined in accordance with page sizes of the inputted data, combining the determined number of pages as one page, and outputting the thus combined data, said output apparatus comprising:

a memory for storing a number of pages of inputted data before combination and a number after combination;

an input unit for enabling a user to input a selection to record one of the number of pages of inputted data before combination, the number of pages after combination, and both the number of pages of inputted data before combination and the number of pages after combination; and a display unit for displaying one of the number of pages of inputted data before combination, the number of pages after combination, and both the number of pages of inputted data before combination and the number of pages after combination, in accordance with the selection inputted by the user using said input unit.

26. An output method of an output apparatus to which is inputted data of a plurality of pages, the output apparatus including functions for determining a number of pages to be combined in accordance with page sizes of the inputted data, combining the determined number of pages as one page, and outputting the thus combined data, said method comprising the steps of:

storing a number of pages of inputted data before combination and a number after combination;

inputting, by a user, a selection to record one of the number of pages of inputted data before combination, the number of pages after combination, and both the number of pages of inputted data before combination and the number of pages after combination; and displaying one of the number of pages of inputted data before combination, the number of pages after combination, and both the number of pages of inputted data before combination and the number of pages after combination, in accordance with the selection inputted by the user in said inputting step.

* * * * *

UNITED STATES PATENT AND TRADEMARK OFFICE
CERTIFICATE OF CORRECTION

PATENT NO. : 6,563,607 B1
DATED : May 13, 2003
INVENTOR(S) : Naomi Nakamura et al.

It is certified that error appears in the above-identified patent and that said Letters Patent is hereby corrected as shown below:

Column 1,
Line 45, "that" should be deleted.
Line 61, "proposed" hsould read -- proposed --.

Column 4,
Line 48, "select" should read -- selecting --.

Column 5,
Line 65, "(i+1th" should read -- (i+1)th --.

Column 6,
Line 35, "according" should read -- according to --.

Column 7,
Line 14, "transmit" should read -- transmits --.

Signed and Sealed this

Eleventh Day of November, 2003

JAMES E. ROGAN
*Director of the United States Patent and Trademark Office*